United States Patent [19]

Robertson

[11] 4,119,478

[45] Oct. 10, 1978

[54] PIGMENT COMPOSITION

[75] Inventor: George Heddle Robertson, Paisley, Scotland

[73] Assignee: Ciba-Geigy Corporation, Ardsley, N.Y.

[21] Appl. No.: 758,622

[22] Filed: Jan. 12, 1977

[30] Foreign Application Priority Data

Jan. 16, 1976 [GB] United Kingdom ............... 1676/76

[51] Int. Cl.² .................................................. C09C 3/08
[52] U.S. Cl. ........................... 106/288 Q; 106/308 N; 106/309; 106/289
[58] Field of Search ................... 106/288 Q, 308 N

[56] References Cited

U.S. PATENT DOCUMENTS

| 3,560,235 | 2/1971 | Sarfas et al. ............... | 106/288 Q |
| 3,728,301 | 4/1973 | Spence et al. .............. | 106/308 N |
| 3,884,713 | 5/1975 | Robertson et al. .......... | 106/288 Q |

*Primary Examiner*—Patrick Garvin
*Assistant Examiner*—J. V. Howard
*Attorney, Agent, or Firm*—Michael W. Glynn; Vincent J. Cavalieri

[57] ABSTRACT

A pigment composition comprising a pigment and a colorless compound containing one or more basic nitrogen atoms directly attached to a carbon atom in a pyridine or benzimidazole ring system and having one or more urea or urethane groups which composition shows improved rheology and final application properties such as better flow properties, color strength, gloss and flocculation resistance.

10 Claims, No Drawings

PIGMENT COMPOSITION

The present invention relates to pigment compositions having improved gloss, strength and rheological properties in application media.

In the dispersion of finely divided particles, such as pigments into organic media the rheology of the system is of great importance. Poor rheological properties, e.g. thick and thixotropic dispersions are generally assumed to be related to flocculation of the particles in the dispersion. As well as causing poor rheology this flocculation causes a loss of gloss and colour strength. During the grinding stage in the preparation of inks and paints flocculation causes the dispersions to become very thick and thixotropic thereby making the formulations difficult to handle. More easily handleable formulations can be obtained by decreasing the pigment content but this obviously affects the through-put of pigment from a given grinding capacity.

We have now found that pigments can be treated with certain colourless compounds which markedly improve the rheological properties and provide more fluid dispersions with improved gloss and colour strength in the application media. These improved rheological properties also give the option of providing an increased pigmentation level during the initial grinding stages in the coating formulations thus improving the through-put for a given grinding capacity.

Accordingly, the present invention provides a pigment composition comprising a pigment and a colourless compound containing one or more basic nitrogen atoms, in a pyridine or benzimidazole ring, and having one or more urea or urethane groups. The urea and urethane groups are formed by the reaction of a di-isocyanate with a mono- or di-functional amino or hydroxyl derivative of a pyridine or benzimidazole compound and optionally a mono- or di-functional compound, free of basic heterocyclic nitrogens, in which the functional groups are primary or secondary amino groups and/or hydroxyl groups. In all instances the functionality of the reactants is such that the isocyanate groups are substantially all converted to urea or urethane groups.

The pigment used in the compositions of the invention may be organic or inorganic or mixtures of such pigments. If an organic pigment is used it may be, for example, a phthalocyanine which may be a metal phthalocyanine, such as copper phthalocyanine, a metal free phthalocyanine, or a chlorinated phthalocyanine, an azo pigment (monoazo or disazo) an azo metal salt, an anthraquinone or a metal complex pigment. If an inorganic pigment is used it may be, for example, titanium dioxide, carbon black, or iron oxide.

The colourless compound is derived from a pyridine or benzimidazole compound.

Suitable pyridine derivatives include 2,3 and 4- amino pyridine or 2,6 diaminopyridine which may be substituted by halogen atoms, alkyl groups having 1 to 22 carbon atoms or alkoxy groups having 1 to 22 carbon atoms.

Suitable benzimidazole derivatives include 2-aminobenzimidazole and 2-(p-aminophenyl) benzimidazole which may be substituted by halogen atoms, alkyl groups having 1 to 22 carbon atoms, or alkoxy groups having 1 to 22 carbon atoms, and the 2-(hydroxyalkyl)- or 2-(hydroxyalkaryl)-benzimidazoles with similar substituents, e.g. 2-methylol benzimidazole, 2-(α hydroxyethane) benzimidazole, and 2-(α-hydroxybenzyl) benzimidazole, which may be substituted by halogen atoms, alkyl groups having 1 to 22 carbon atoms or alkoxy groups having 1 to 22 carbon atoms.

When a halogen substituent is present it may be, for example, chlorine or bromine. When an alkyl substituent is present it may be, for example, methyl, ethyl, propyl, butyl, octyl or octadecyl. When an alkoxy substituent is present it may be, for example, methoxy, ethoxy, or octyloxy, octadecyloxy.

The diisocyanate may be aliphatic or aromatic. Suitable diisocyanates include 2,4- and/or 2,6-tolylene diisocyanate, 4,4'-diisocyanato-diphenyl methane and 1,6-hexamethylene diisocyanate.

When mono- or di-functional compounds free of the basic heterocyclic nitrogens are used in the preparation of the colourless compounds they contain amino and hydroxyl groups reactive towards the di-isocyanate.

The mono-functional compounds are illustrated by the formulae ROH or $RR_1NH$ where R is an alkyl, cycloalkyl, aryl or aralkyl group and $R_1$ is hydrogen or is the same as R. When R and/or $R_1$ is a hydrocarbon residue each may be methyl, ethyl, butyl, octyl, decyl, octadecenyl, cyclohexyl, phenyl or phenyl substituted with such alkyl groups as listed herein before for R and $R_1$.

When a di-functional compound containing amine groups is used, the amine groups are primary or secondary. Thus the compounds can be diamines or amino-hydroxy compounds. Suitable diamines include polymethylene diamines such as ethylene diamine, propylene diamine and 1,6-hexamethylene diamine, and alkyl-/alkylene diamines, such as N-alkyl-1,3-propylene diamines, which are available under the trade names Duomeen C or Duomeen T. Suitable amino hydroxy compounds include amino phenols such as 4-amino phenol or, preferably, amino alcohols, such as ethanolamine.

When a di-functional hydroxy compound is used, it may be phenolic, for example, hydroquinone or resorcinol, but is preferably alcoholic. Suitable alcoholic compounds include the α,ω-polymethylene primary glycols of the formula $HO(CH_2)_nOH$ where $n$ is 2-12; branched primary glycols, such as neopentyl glycol; secondary or tertiary glycols, such as butylene glycol, 2-methyl pentane 2,4-diol and 2-ethyl hexane-1,3-diol; glycols containing ether or thioether linkages, such as diethylene glycol and thiodiglycol; and glycols with substituent side chains such as monoesters of glycerol, e.g. glyceryl monooleate, or mono ethers of glycerol, e.g. glyceryl monostearyl ether.

The colourless compounds may be prepared by condensing the diisocyanate with the other compounds in a polar solvent such as acetone or methyl ethyl ketone. The reaction may be carried out in one stage by adding the diisocyanate to a mixture of the other reactants. Alternatively the reaction may be carried out stepwise by reacting the mono- or difunctional compound free of basic heterocyclic nitrogen atoms with the diisocyanate and the excess isocyanate is then reacted with the basic nitrogen-containing compound, or vice-versa. The stepwise procedure may be advantageous in controlling the reaction of the isocyanate with groups which have differing reactivity towards isocyanate, e.g. primary alcohol, secondary alcohol, primary amine and secondary amine.

The compositions of the invention may contain the colourless compound in an amount of from 1 to 50% by weight.

The colourless compound may be incorporated into the composition by blending with the pigment. This may be carried out by any conventional method, but it is preferably carried out under aqueous conditions. Preferably the colourless compound is dissolved in an acidic medium and the acidic solution is added to an aqueous dispersion or slurry of the pigment. The acid is preferably glacial acetic acid. Alternatively, the pigment and colourless compound may be mixed under acidic conditions. After mixing, the colourless compound is rendered insoluble either by adding an alkali to increase the pH or by further dilution with water.

Although the compositions of the invention may be based on untreated pigments, particularly advantageous results are observed when the pigment is treated with an acidic dyestuff and/or a carboxy ester stabiliser.

The dyestuff is normally of a similar structure to the pigment, but contains carboxyl, sulphonic or phosphonic acid groups. Suitable types of dyestuff are more fully described in U.K. Patent specifications Nos. 1,356,253, 1,356,254 and 1,263,684, and in our copending Application No. 37106/75. The dyes are applied to the pigment under aqueous conditions and, preferably, before the addition of the colourless compound. The proportion of acidic dyestuff is such that there is an excess of basic groups from the basic derivative. Preferred compositions contain <10% w/w especially 0.5-5% w/w on pigment of the acidic dyestuff.

The carboxy ester stabilisers which may be used either with untreated pigments or with dyestuff treated pigments, and are preferably added after the basic derivative, have an acid value in the range of from 15 to 140 mg.KOH/g and are formed by the reaction of (a) a compound of formula ROH, or a mixture of such compounds, wherein R is an alkyl or alkenyl residue, each having more than 12 carbon atoms, or a hydroxy-terminated carboxylic acid ester having from 12 to 100 carbon atoms with (b) trimellitic acid or a derivative thereof. These esters are described in our copending Application No. 10239/75.

The compositions of the invention show advantages in various application media such as
1. Alkyd resins in hydrocarbon solvents, e.g. long oil alkyd in white spirit (air drying decorative paint) or short oil alkyds in xylene (industrial paint which may also contain such curing resins as ureaformaldehyde or melamine-formaldehyde.
2. Zinc/calcium rosinate and phenolic modified resins in hydrocarbon solvents (e.g. publication gravure media).
3. Acrylic resins in hydrocarbon solvents, e.g. acrylic resins in xylene (industrial paint which may also contain curing resins such as ureaformaldehyde or melamine-formaldehyde.
4. P.V.C. plasticisers, (e.g. di-octyl phthalate as used for producing pigment dispersions for incorporation into P.V.C.).

In all these cases the compositions show improved rheology and final application properties such as colour strength, gloss and flocculation resistance. The improved rheology is illustrated by the better flow properties of pigment dispersions at various stages of preparation. This change can be measured by various standard viscometers and expressed as poise or it may be measured by some relevant technique such as discharge (% and time) from a standard ball mill through a standard aperture or efflux time through a standard aperture such as a Zahn or Ford Cup or rate and distance of flow down a graduated inclined glass plate. The more fluid dispersions will give a higher percentage discharge, a faster rate of discharge and travel further on the inclined plate. All these techniques are used in the industry to assess pigment dispersions.

It is also possible to utilise the improved flow potential of these compositions by increasing the pigmentation level during the grinding stages in the formulation of inks, paints and plastics. This facet can be optimised by the use of the carboxy-ester products. These increased pigment loadings have advantages in terms of the economics of pigment throughput in the preparation of ink, paints and plastics, and the products from these compositions still offer the extra applicational advantages of gloss and strength.

The invention will be illustrated by the following Examples, in which parts and percentages are by weight.

EXAMPLE A

A derivative based on 2-amino pyridine, ethylene glycol and tolylene di-isocyanate in a 2:1:2 mole ratio was prepared as follows:

42.3 Parts 2-amino pyridine and 13.95 parts ethylene glycol were dissolved in 150 parts methyl ethyl ketone. 78.3 Parts of an 80/20 mixture of 2,4- and 2,6-tolylene di-isocyanate were then added and the solution stirred for 10 minutes and then heated to reflux. The reflux was continued for about 2 hours until an infra red scan of the mixture showed no NCO band. The product was then filtered, washed with methyl ethyl ketone and dried at 60° C.

EXAMPLE B

A derivative based on 2-amino pyridine, ethylene diamine and tolylene di-isocyanate in a 2:1:2 mole ratio was prepared as follows:

42.3 Parts 2-amino pyridine and 13.5 parts ethylene diamine were dissolved in 300 parts methyl ethyl ketone. 78.3 Parts of an 80/20 mixture of 2,4- and 2,6-tolylene diisocyanate were then added and the solution stirred for 10 minutes and then heated to reflux and held at reflux for 2 hours. After this period an infra red scan of the mixture showed no NCO band. The product was then recovered in the manner described in Example A.

EXAMPLE C

A derivative based on 2-amino pyridine, glycerol mono-oleate and tolylene di-isocyanate in a 2:2:3 mole ratio was prepared as follows:

143.2 Parts of glyceryl mono-oleate were dissolved in 250 parts methyl ethyl ketone and 104.4 parts of 2,4 tolylene di-isocyanate added over 10 minutes. The mixture was heated to reflux and held at reflux for 3 hours then allowed to cool. 37.6 Parts of 2-amino pyridine in 100 parts of methyl ethyl ketone were then added and after the exothermic reaction was complete the mixture was heated to reflux and held at reflux for 2 hours. There was no detectable NCO band present in the mixture after this period. 200 Parts of aliphatic hydrocarbon were added to this mixture and the product removed by filtration, washed with further hydrocarbon and dried at 60° C.

EXAMPLE D

A derivative based on 2-amino-benzimidazole, ethylene glycol and tolylene di-isocyanate in a 2:1:2 mole ratio is prepared as follows:

20 Parts of 2-amino-benzimidazole and 5 parts of ethylene glycol were dissolved in 100 parts of methyl ethyl ketone. 26 Parts of an 80/20 mixture of 2,4- and 2,6-tolylene di-isocyanate in 50 parts of methyl ethyl ketone were then added over 10 minutes. After the exothermic reaction was completed the mixture was heated to reflux and held at reflux for 1 hour at which time there was no detectable NCO band on an infra red scan of the mixture. The product was recovered by the method described in Example C.

EXAMPLES E-K

Derivatives based on various basic heterocyclic nitrogen derivatives, di-isocyanates and difunctional compounds were prepared according to the procedure of example A. In all cases the mole ratio of basic compound:difunctional compound:di-isocyanate was 2:1:2.

| Ex. | Basic Derivative | Difunctional Compound | Di-isocyanate |
|---|---|---|---|
| E | 2-amino pyridine | Neopentyl glycol | T.D.I.[1] |
| F | 2-amino pyridine | Ethylene-glycol | HMDI dimer[2] |
| G | 3-amino pyridine | Ethylene-glycol | T.D.I. |
| H | 2-amino-benzimidazole | Ethanolamine | T.D.I. |
| I | 2-amino pyridine | Hexane 1,6 diol | T.D.I. |
| J | 2-amino pyridine | Diethylene glycol | T.D.I. |
| K | 2-amino pyridine | N-alkyl 1,3 propylene diamine | T.D.I. |

[1]Tolylene di-isocyanate, an 80/20 mixture of 2,4- and 2,6- compounds.
[2]Dimer of hexane 1,6- di-isocyanate of formula CCN–(CH$_2$)$_6$NHCONH(CH$_2$)$_6$NCC.

EXAMPLE L

A derivative based on oleyl alcohol, 2,6-diamino pyridine and tolylene di-isocyanate in a mole ratio 2:1:2.

17.9 parts of oleyl alcohol and 3.6 parts of 2,6-diamino pyridine were dissolved in 300 parts of methyl ethyl ketone. 11.6 parts of an 80/20 mixture of 2,4- and 2,6-tolylene di-isocyanate was then added over 5 minutes. The mixture was then brought to the reflux and held at reflux for 4 hours, after which time there was no detectable NCO band on an infra-red scan of the mixture. The product was isolated by recovery of the methyl ethyl ketone by distillation under reduced pressure.

EXAMPLE 1

100 Parts of a freshly prepared aqueous slurry of C.I. Pigment Yellow 3 (prepared by conventional azo coupling in an acetate buffered system) were heated to 70° C. and 5 parts of a solution of the product from Example A in 20 parts of glacial acetic acid were added. The mixture was stirred for 10 minutes at 70° C. and the pH was adjusted to 8 with dilute sodium hydroxide solution. The product was then filtered off, washed and dried.

This product was then dispersed by ball milling into a long oil alkyd medium and made up to a final paint containing 10% pigment at a 1/4.7 pigment to binder ratio. The resultant paint showed improved gloss and was 20% stronger as a 1/25 reduction paint with titanium dioxide compared to a similar paint containing C.I. Pigment Yellow 3 which had not been treated with the product of Example A.

When 3 parts of the treated product of this example were dispersed into 1 part of lithographic varnish the ink was 20% stronger than a similar ink prepared from the comparison untreated pigment. Also improved rheology was indicated by the fact that the viscosity of the ink from the treated product was 650 poise whereas the viscosity of the ink from the untreated pigment is 870 poise.

EXAMPLE 2

Example 1 was repeated, except that the product of Example A was replaced by the product of Example D. Similar results were obtained in the decorative paint media. In the lithographic ink, the product was 15% stronger with a viscosity of 440 poise.

EXAMPLES 3-8

The procedure of Example 1 was repeated, except that the C.I. Pigment Yellow 3 was replaced by C.I. Pigment Yellow 1, which was treated with the products as shown in the Table. The treated pigments were dispersed in the long oil alkyd as described in Example 1.

| Ex. | Product | % Product | Alkyd Paint Flow[1] | GLoss | Strength[3] | Litho Flow[2]* poise |
|---|---|---|---|---|---|---|
| 3 | A | 10 | 24 | Superior | +5% | 1530 |
| 4 | A | 5 | 21 | " | " | 1740 |
| 5 | D | 10 | 22 | " | " | 1090 |
| 6 | C | 5 | 20 | " | " | 1310 |
| 7 | B | 10 | 21 | " | " | 1720 |
| 8 | — | — | 17 | Control | Control | 2834 |

*of the litho-varnish as described in Example 1.
[1]Flow of paint as measured by distance travelled down an inclined plane with standard graduation-higher numbers indicate more fluid products.
[2]As measured on cone + plate viscometer
[3]% greater (+) or less (−) than standard

EXAMPLES 9-16

35 Parts selected pigment compositions from the above examples were dispersed by ball-milling for 16 hours in 55 parts white spirit and 10 parts of a carboxy ester prepared from oleyl alcohol, trimellitic anhydride and hexane 1,6 diol according to example B of our co-pending application No. 10239/75. The results are shown in the Table below. % Discharge (seconds) refers to the % of dispersion that can be discharged through a standard aperture without agitation in the given time.

| Example | Pigment Composition | % Discharge (seconds) |
|---|---|---|
| 9 | Example 1 | 83 (20 secs.) |
| 10 | Example 2 | 85 (18 secs.) |
| 11 | Untreated comparison of Example 1 | Nil |
| 12 | Example 4 | 90.6 (14 sec.) |
| 13 | Example 5 | 86% (14 secs.) |
| 14 | Example 6 | 66% (52 secs.) |
| 15 | Example 7 | 88% (25 secs.) |
| 16 | Example 8 | Nil |

These dispersions were let down into a standard paint and gave colouristic properties similar to the pigment compositions when dispersed at 15% at a 1/2 pigment composition/long oil alkyd binder and made up to a final paint as for Example 1. In comparisons C.I. Pigment Yellow 1 was treated according to the procedure of Example 3 with 10% w/w of compounds prepared from a) NN dimethyl aminopropylamine, tolylene diisocyanate and ethylene glycol in a mole ratio of 2:2:1, and b) as a) except that the ethylene glycol was replaced by ethylene diamine. Both were prepared according to British Patent specification No. 1,235,283. The resultant pigment composition were then dispersed as Example 9 and the % discharge was nil.

EXAMPLE 17

A 5% w/w aqueous slurry of C.I. Pigment Yellow 129 was heated to 70° C. with vigorous stirring. A solution of 10 parts of the product of Example A in glacial acetic acid was added, and the vigorous stirring continued for a further 15 minutes. The pH was adjusted to 7.5–8.0 with dilute sodium hydroxide and the product filtered, washed and dried. The resultant product was dispersed into a xylene/butanol (4/1) stoving acrylic paint. When compared with paint prepared from an untreated pigment this treated pigment showed improved gloss and flow properties. On the graduated inclined plane the paint from the treated pigment recorded 26 divisions whereas the untreated pigment gave only 16.

EXAMPLE 18

The procedure of Example 17 was repeated, except that the product of Example A is replaced by the product of Example D. The resultant acrylic paint showed improved gloss and flow. On the graduated inclined plate this paint moved 22.5 divisions as against the 16 divisions of the standard.

EXAMPLES 19–24

These examples illustrate the combined effect of acid dyestuff and basic derivative. The results in various media are given in the Table attached. 100 part portions of an aqueous slurry of C.I. Pigment 73 were treated as shown. The dye added was an aqueous solution parachloro-ortho-nitro aniline coupled to acetoacet-para-sulpho anilide (PCONA→AASA). The basic additives were added in acetic acid solutions as for example 1. In the case of dye and basic additive the former was added first. The pigment slurries and any additives were then heated to 80° C. and held at this temperature for 10 minutes, the pH adjusted to 5 for example 20 and to 7 in the other instances. The pigment compositions were then filtered, washed and dried at 50° C.

for 15 mins. before adjusting to pH 7, filtering, washing and drying the pigment compositions. The resultant pigment compositions 35 parts, were then milled with 10 parts of the carboxy ester used in examples 9–16 and 55 parts of white spirit. The table below indicates the good flow properties obtained. Colouristic properties when incorporated in a long oil alkyd paint at a 1:25 reduction with titanium dioxide were in all cases 20% stronger than an untreated sample of C.I. Pigment Yellow. % discharge (seconds) has the same meaning as examples 9–16.

| Example | Treatment agent example | % discharge (seconds) |
|---------|-------------------------|------------------------|
| 25 | E | 86% (44 secs.) |
| 26 | F | 89% (30 secs.) |
| 27 | G | 90% (28 secs.) |
| 28 | H | 91% (14 secs.) |
| 29 | I | 88% (30 secs.) |
| 30 | J | 91% (14 secs.) |
| 31 | K | 91% (52 secs.) |
| 16 (control) | Nil | Nil |

EXAMPLES 32–34

Pigmentary beta-copper phthalocyanine at 10% w/w in isopropanol is obtained by the procedure according to example 5 of B.P. 1,140,836. To this slurry the basic additive or acidic dyestuff + basic additive are added in acetic acid solution as shown in Table II attached. The resultant mixture is then diluted with water to a 5% w/w pigment concentration and the isopropanol-water azeotrope distilled off. The aqueous slurry is then filtered, washed and dried at 50° C. The resulant pigment composition is dispersed in a toluene-based publication gravure media to give the results shown.

EXAMPLE 35

10 parts of compound of example A in acetic acid solution was added to 100 parts of a freshly prepared aqueous slurry of C.I. Pigment Yellow 13. The pH was adjusted to 8 and the composition filtered, washed and dried at 50° C. The 4 parts of resultant composition was Table I

| | Pigment Composition | | | Carboxy ester | Application Tests | | | | |
|---|---|---|---|---|---|---|---|---|---|
| | | | | | Long Oil Alkyd Paint[2] | | | Publication Gravure[6] | |
| Example | Pigment Parts | Acid Dye Parts | Basic Derivative (Parts) | % discharge[1] (seconds) | % discharge[3] (seconds) | Flow[4] | Strength[5] | Flow[7] (seconds) | Strength[5] |
| 19 | 100 | 7 | — | Too thick to discharge | Nil | 21 | Control | 13 | Control |
| 20 | 100 | 5 | — | as 19 | 60 (60 secs.) | 25 | +5 | 13 | +15 |
| 21 | 100 | 5 | Example A. 5 | 86 (23 secs.) | 28 | +10 | 13 | +20 | |
| 22 | 100 | 5 | Example C. 5 | 86 (66 secs.) | 90 (30 secs.) | 27 | +10 | 13 | +15 |
| 23 | 100 | — | Example A. 5 | Mobile but not dischargeable | 85 (45 secs.) | 26 | +5 | 16 | C |
| 24 | 100 | — | Example C. 5 | as 23 | 70 (50 secs.) | 24 | +5 | 15 | 0 |

[1]Formulation (35 parts of pigment composition, 10 parts carboxyester etc.) and % discharge as example 9–16.
[2]Standard Beckosol P.470 alkyd media with white spirit solvent.
[3]From a mill formulation of Pigment composition/binder ratio of ½ wt 15% pigment composition.
[4]Distance down inclined plate for paint of pigment composition/binder of 1/47 at 10% pigment composition
[5]% stronger (+) or weaker (−) than control.
[6]A toluene/aliphatic solvent blend at 40/60*w/w ratio with a zinc calcium resinate/phenolic binder.
[7]As measured in a No. 3 Zahn Cup from a pigment composition/binder ratio of 1/2 at 15% pigment composition.

EXAMPLES 25–31

5 parts of the agents E-K, dissolved in acetic acid solution were added to 100 part portions of a freshly prepared aqueous slurry of C.I. Pigment Yellow 1. The slurry was heated to 80° C. and held at this temperature dispersed in 6 parts di-octyl phthalate plasticiser. The viscosity of this dispersion was 54,000 poise whereas a dispersion prepared from C.I. Pigment Yellow 13 prepared as above but without the compound of Example A gave a viscosity of 141,700 poise.

Table II

| Example | Pigment Composition | | | Publication Gravure Test | | |
| --- | --- | --- | --- | --- | --- | --- |
| | Beta-copper Phthalocyanine | Dyestuff[1] (parts) | Basic Derivative (parts) | % discharge[2] (seconds) | Flow[3] (seconds) | Strength[4] |
| 32 | 100 | — | Example A 10 | 68 (43 secs.) | 14 | −5 |
| 33 | 100 | 1 | Example A 10 | 81 (28 secs.) | 12 | −5 |
| 34 | 100 | — | — | Nil | Too Thick | Control |

[1] A dyestuff of the formula $CuPc(SO_3H)_2SO_2(NHCH_2CH_2OH)_2$.
[2] % discharge as example 9–6 from a mill formulation of ⅓ pigment/binder at 15% pigmentation.
[3] Efflux time of a Number 3 Zahn Cup for same formulation as [2] above.
[4] As for example 19–24.

What is claimed is:

1. A pigment composition comprising a pigment and a colourless compound containing one or more basic nitrogen atoms directly attached to a carbon atom in a pyridine or benzimidazole ring system and having one or more urea or urethane groups.

2. A composition as claimed in claim 1, in which the urea or urethane groups are formed by the reaction of a di-isocyanate with a mono- or di-functional amino or hydroxyl derivative of a pyridine or benzimidazole compound and optionally a mono or di-functional compound free of basic heterocyclic nitrogens, in which the functional groups are primary or secondary amino groups and/or hydroxyl groups.

3. A composition as claimed in claim 2, in which the pyridine derivative is a 2,3 or 4-aminopyridine, or 2,6-diaminopyridine, optionally substituted by halogen atoms or alkyl or alkoxy groups, having 1 to 22 carbon atoms.

4. A composition as claimed in claim 2, in which the benzimidazole derivative is 2-aminobenzimidazole, 2-(p-aminophenyl) benzimidazole, a 2-(hydroxyalkyl) benzimidazole or 2-(hydroxyalkaryl) benzimidazole, optionally substituted with halogen atoms or alkyl or alkoxy groups having 1 to 22 carbon atoms.

5. A composition as claimed in claim 2, in which the di-isocyanate is 2,4 and/or 2,6-tolylene diisocyanate, 4,4′-diisocyanato-diphenyl methane or 1,6-hexamethylene diisocyanate.

6. A composition as claimed in claim 2, in which a mono-functional compound free of basic heterocyclic nitrogens is present and is a compound of the formula $ROH$ or $RR_1NH$ in which R is an alkyl, cycloalkyl, aryl or aralkyl group and $R_1$ is hydrogen or the same as R.

7. A composition as claimed in claim 2, n which a di-functional compound free of basic heterocyclic nitrogens is present and is a diamine, an amino-alcohol, an amino phenol, a glycol or a di-functional phenol.

8. A composition as claimed in claim 1, which contains the colourless compound in amounts of from 1 to 50% by weight.

9. A composition as claimed in claim 1, in which the pigment is one which has been treated with an acidic dyestuff and/or carboxy ester stabiliser.

10. A composition as claimed in claim 9, in which the dyestuff is of a similar structure to the pigment, but contains carboxyl, sulphonic or phosphonic acid groups.

* * * * *